United States Patent
Gonzalez et al.

(10) Patent No.: US 10,060,324 B2
(45) Date of Patent: Aug. 28, 2018

(54) MAT AND DEVICES WITH THE SAME

(75) Inventors: Javier E. Gonzalez, East Amherst, NY (US); Loyd R. Hornback, III, Stillwater, MN (US); Kim C. Sachs, Inver Grove Heights, MN (US); Andrew B. Supina, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1588 days.

(21) Appl. No.: 13/255,000

(22) PCT Filed: Mar. 11, 2010

(86) PCT No.: PCT/US2010/026893
§ 371 (c)(1),
(2), (4) Date: Sep. 6, 2011

(87) PCT Pub. No.: WO2010/105000
PCT Pub. Date: Sep. 16, 2010

(65) Prior Publication Data
US 2011/0314780 A1 Dec. 29, 2011

Related U.S. Application Data

(60) Provisional application No. 61/159,852, filed on Mar. 13, 2009.

(51) Int. Cl.
*B32B 27/12* (2006.01)
*B32B 27/30* (2006.01)
(Continued)

(52) U.S. Cl.
CPC .............. *F01N 13/148* (2013.01); *B32B 3/04* (2013.01); *B32B 3/266* (2013.01); *B32B 5/022* (2013.01);
(Continued)

(58) Field of Classification Search
None
See application file for complete search history.

(56) References Cited

U.S. PATENT DOCUMENTS 3,001,571 A 9/1961 Hatch
3,916,057 A 10/1975 Hatch
(Continued)

FOREIGN PATENT DOCUMENTS

DE 4107539 A1 * 9/1992 .............. F01N 7/08
EP 0551532 7/1993
(Continued)

OTHER PUBLICATIONS

What is Vermiculite?, May 9, 2011, Dupre Minerals Limited, All pages https://web.archive.org/web/20110509031543/http://www.dupreminerals.com/en/vermiculite/introduction.*
(Continued)

*Primary Examiner* — Amber R Orlando
*Assistant Examiner* — Britanny Precht
(74) *Attorney, Agent, or Firm* — Harold C. Knecht, III (57) ABSTRACT

Mats comprising a non-woven layer and a first polymeric layer on a major surface thereof. The mats are useful, for example, a mounting mats for pollution control devices, as well as thermal and acoustic insulation for pollution control devices and exhaust systems.

20 Claims, 5 Drawing Sheets

(51) Int. Cl.

| | | |
|---|---|---|
| *B32B 27/32* | (2006.01) | |
| *B32B 27/34* | (2006.01) | |
| *B32B 27/36* | (2006.01) | |
| *B32B 27/40* | (2006.01) | |
| *B32B 3/04* | (2006.01) | |
| *B32B 3/26* | (2006.01) | |
| *B32B 5/02* | (2006.01) | |
| *B32B 5/22* | (2006.01) | |
| *B32B 5/26* | (2006.01) | |
| *B32B 7/06* | (2006.01) | |
| *B32B 7/12* | (2006.01) | |
| *F01N 13/14* | (2010.01) | |
| *F01N 3/28* | (2006.01) | |

(52) U.S. Cl.
CPC ............ *B32B 5/22* (2013.01); *B32B 5/26* (2013.01); *B32B 7/06* (2013.01); *B32B 7/12* (2013.01); *B32B 27/12* (2013.01); *B32B 27/302* (2013.01); *B32B 27/32* (2013.01); *B32B 27/34* (2013.01); *B32B 27/36* (2013.01); *B32B 27/365* (2013.01); *B32B 27/40* (2013.01); *F01N 3/2857* (2013.01); *F01N 3/2864* (2013.01); *B32B 2262/10* (2013.01); *B32B 2270/00* (2013.01); *B32B 2307/102* (2013.01); *B32B 2307/30* (2013.01); *B32B 2307/304* (2013.01); *B32B 2307/58* (2013.01); *B32B 2307/718* (2013.01); *B32B 2605/00* (2013.01); *Y10T 156/1056* (2015.01); *Y10T 428/1366* (2015.01); *Y10T 428/24298* (2015.01); *Y10T 428/24322* (2015.01)

(56) References Cited

U.S. PATENT DOCUMENTS

| | | | |
|---|---|---|---|
| 4,156,533 A | | 5/1979 | Close |
| 4,181,514 A | | 1/1980 | Lefkowitz |
| 4,521,333 A | | 6/1985 | Graham |
| 4,999,168 A | | 3/1991 | Ten Eyck |
| 5,008,086 A | | 4/1991 | Merry |
| 5,686,039 A | | 11/1997 | Merry |
| 6,340,645 B1 * | | 1/2002 | Horacek et al. ............ 442/138 |
| 6,551,951 B1 | | 4/2003 | Fay et al. |
| 6,726,884 B1 * | | 4/2004 | Dillon et al. ............... 422/179 |
| 6,923,942 B1 | | 8/2005 | Shirk |
| 8,186,058 B2 | | 5/2012 | Merry |
| 8,262,764 B2 * | | 9/2012 | Okabe ............... 55/523 |
| 8,308,837 B2 * | | 11/2012 | Okabe ............... 55/523 |
| 2001/0018306 A1 | | 8/2001 | Jones |
| 2004/0052698 A1 * | | 3/2004 | Sanocki et al. ........... 422/179 |
| 2004/0134172 A1 * | | 7/2004 | Kumar et al. ............. 55/523 |
| 2004/0259731 A1 * | | 12/2004 | Yan ............... 502/439 |
| 2005/0232827 A1 * | | 10/2005 | Merry ............ 422/179 |
| 2005/0232828 A1 * | | 10/2005 | Merry ............ 422/179 |
| 2006/0070554 A1 | | 4/2006 | Braunreiter |
| 2006/0154040 A1 * | | 7/2006 | Merry ............ 428/292.1 |
| 2008/0181831 A1 * | | 7/2008 | Okabe ............ 422/177 |
| 2008/0274307 A1 | | 11/2008 | Chereau |
| 2009/0049690 A1 * | | 2/2009 | Eguchi ............ 29/890 |

FOREIGN PATENT DOCUMENTS

| | | | | |
|---|---|---|---|---|
| EP | 551532 A1 * | 7/1993 | ............ | C08K 9/02 |
| EP | 639700 | 2/1995 | | |
| EP | 639701 | 2/1995 | | |
| EP | 639702 | 2/1995 | | |
| EP | 1182333 | 2/2002 | | |
| EP | 1495807 | 1/2005 | | |
| JP | 62-121033 | 6/1987 | | |
| JP | 62121033 | 6/1987 | | |
| JP | 62121033 A * | 6/1987 | ............ | B29C 63/02 |
| JP | H0752649 A | 2/1995 | | |
| JP | 2000343634 | 12/2000 | | |
| JP | 2001012237 | 1/2001 | | |
| JP | 2002047070 | 2/2002 | | |
| WO | WO 99/23370 | 5/1999 | | |
| WO | WO 2004/011785 | 2/2004 | | |
| WO | WO 2006/055188 | 5/2006 | | |
| WO | WO 2006/065534 | 6/2006 | | |
| WO | WO 2008/124449 | 10/2008 | | |
| WO | WO 2008/156942 | 12/2008 | | |

OTHER PUBLICATIONS

PCT International Search Report for PCT/US2010/026893, dated Jun. 1, 2010.

* cited by examiner

MAT AND DEVICES WITH THE SAME

CROSS REFERENCE TO RELATED APPLICATIONS

This application is a national stage filing under 35 U.S.C. 371 of PCT/US2010/026893, filed Mar. 11, 2010, which claims priority to U.S. Provisional Application No. 61/159,852, filed Mar. 13, 2009, the disclosure of which is incorporated by reference in its/their entirety herein.

BACKGROUND

Pollution control devices such as catalytic converters for gasoline engines have been known for over 30 years. In the last few years, more stringent regulations for diesel vehicles have resulted in a rapid increase in the use of other pollution control devices including diesel oxidation catalysts (DOC's), diesel particulate filters (DPF's), and selective catalytic reduction devices (SCR's). The pollution control devices typically comprise a metal housing or casing with a pollution control element securely mounted within the casing by a resilient and flexible mounting mat. Catalytic converters, including diesel oxidation converters, contain a catalyst, which is typically coated on a monolithic structure. The monolithic structures are typically ceramic, although metal monoliths are also known. The catalyst in a gasoline engine oxidizes carbon monoxide and hydrocarbons and reduces the oxides of nitrogen to control atmospheric pollution. A diesel oxidation catalyst oxidizes the soluble organic fraction of soot particles as well as any carbon monoxide present.

Diesel particulate filters or traps are typically wall-flow filters, which have honeycombed, monolithic structures that are typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust are collected. From time to time, the temperature of the exhaust gas is increased above the incineration temperature of the soot particles so that they are burned. This process is called "regeneration."

Selective catalytic reducers are similar in structure and in function (i.e., reduce NOx) to catalytic converters. A gaseous or liquid reductant (generally ammonia or urea) is added to the exhaust gas before reaching the selective catalytic reducer monolith. The mixed gases cause a reaction between the NOx emissions and the ammonia or urea. The reaction converters the NOx emissions into pure nitrogen and oxygen.

The monoliths, and in particular the ceramic pollution control monoliths, used in pollution control devices are fragile, and susceptible to vibration or shock damage and breakage. They have a coefficient of thermal expansion generally an order of magnitude less than the metal housing that contains them. This means that as the pollution control device is heated the gap between the inside periphery wall of the housing and the outer wall of the monolith increases. Even though the metallic housing undergoes a smaller temperature change due to the insulating effect of the mat, the higher coefficient of thermal expansion of the metallic housing causes the housing to expand to a larger peripheral size faster than the expansion of the ceramic monolith. Such thermal cycling occurs hundreds of times during the life and use of the pollution control device.

To avoid damage to the ceramic monoliths from road shock and vibration, to compensate for the thermal expansion difference, and to prevent exhaust gases from passing between the monolith and metal housing (thereby bypassing the catalyst), mounting mats are disposed between the ceramic monolith and metal housing. These mats exert sufficient pressure to hold the monolith in place over the desired temperature range but not so much pressure as to damage the ceramic monolith. Known pollution control mounting mats include intumescent and non-intumescent sheet materials comprised of inorganic (e.g., ceramic) fibers, and organic and/or inorganic binders.

Some exhaust system components for use in an exhaust system of a motor vehicle (e.g., a motor vehicle having an internal combustion engine) use an insulation material in the gap of a double wall of the exhaust system component.

Pollution control devices typically must reach a certain temperature (e.g., 250° C. or above) before they "light off" or begin to oxidize carbon monoxide and hydrocarbons. They are therefore preferably located close to the engine. Additionally, insulation is typically provided between the pollution control device and the housing of the converter, and it is generally also preferred to insulate exhaust system components between the engine and the pollution control device so as to minimize heat loss and therefore decreases the time for "light off" to occur. This is particularly significant when the car is first started, especially in cold weather, to satisfy the increasingly stringent air quality standards.

Therefore, insulation is typically placed in the end cone region of the catalytic converter. The end cone region typically has a double-wall construction that includes an outer metal cone and an inner metal cone with a gap defined between the two cones. Insulation material can be placed in the gap between the inner and outer metal housings. The insulation can be in the form of a mat or as a three-dimensional form. A variety of insulation materials have been disclosed for use in exhaust system components.

Additional mounting mats and insulation materials are desired, including those having increased flexibility, reduced fiber shedding, and/or relative low organic content.

SUMMARY

In one aspect of the present invention a mat is provided that comprises a non-woven layer having first and second major surfaces that are generally opposed to each other, and a first polymeric layer. The non-woven layer comprises inorganic fibers. The first polymeric layer is attached so as to contact at least some of the inorganic fibers forming the first major surface. The first polymeric layer comprises at least one vacuum-formed suction hole, and preferably a plurality of vacuum-formed suction holes, formed therethrough. A "suction hole" refers to a hole formed through a polymeric layer, when the polymeric layer is heated to a softening and/or melting point that allows the vacuum to form a suction hole through the polymeric film.

In a first exemplary embodiment, the present disclosure describes an article comprising:
  a mat comprising:
    a non-woven layer having first and second, generally opposed major surfaces, the non-woven layer comprising inorganic fibers; and
    a first three dimensional, polymeric layer attached to the first major surface; and
  a refractory cloth surrounding the mat.

In some embodiments, the inorganic fiber layer has a basis weight in a range from 800 g/m² to 8500 g/m². Typically, the mat has organic content not greater than 7 (6, 5, 4, 3, 2, 1, or even zero) percent by weight, based on total weight of the non-woven layer. Typically the average thickness of the first polymeric layer is up to 35 micrometers (in some embodiments, up to 30, 25, 20, 15, or even up to 10 micrometers; in some embodiments, in a range from 10 micrometers to 25 micrometers).

In a second exemplary embodiment, the present disclosures describes a mat comprising:
  a non-woven layer having first and second, generally opposed major surfaces, the non-woven layer comprising inorganic fibers; and
  a first three dimensional, polymeric layer attached to the first major surface; and
  an intumescent layer having first and second, generally opposed major surfaces, wherein the first major surface of the intumescent layer is attached to the first major of the non-woven layer. Typically, the non-woven layer has organic content not greater than 7 (6, 5, 4, 3, 2, 1, or even zero) percent by weight, based on total weight of the mat. In some embodiments, the inorganic fiber layer has a basis weight in a range from 800 g/m$^2$ to 8500 g/m$^2$. Typically the average thickness of the first polymeric layer is up to 35 micrometers (in some embodiments up to 30, 25, 20, 15, or even up to 10 micrometers; in some embodiments, in a range from 10 micrometers to 25 micrometers).

In a third exemplary embodiment, the present disclosures describes a mat comprising:
  a non-woven intumescent layer having first and second, generally opposed major surfaces comprising:
    inorganic fibers; and
    intumescent material; and
  a first three dimensional, polymeric layer attached to the first major surface. In some embodiments, the inorganic fiber layer has a basis weight in a range from 800 g/m$^2$ to 8500 g/m$^2$. Typically, the non-woven layer has organic content not greater than 7 (6, 5, 4, 3, 2, 1, or even zero) percent by weight, based on total weight of the non-woven layer. Typically the average thickness of the first polymeric layer is up to 35 micrometers (in some embodiments up to 30, 25, 20, 15, or even up to 10 micrometers; in some embodiments, in a range from 10 micrometers to 25 micrometers).

In a fourth exemplary embodiment, the present disclosures describes a mat comprising:
  a non-woven layer having first and second, generally opposed major surfaces, the non-woven layer comprising inorganic fibers; and
  a first three dimensional, polymeric layer attached to the first major surface,
the mat having at least one laser cut edge. Typically, the mat has organic content not greater than 7 (6, 5, 4, 3, 2, 1, or even zero) percent by weight, based on total weight of the non-woven layer. Typically the average thickness of the first polymeric layer is up to 35 micrometers (in some embodiments up to 30, 25, 20, 15, or even up to 10 micrometers; in some embodiments, in a range from 10 micrometers to 25 micrometers). In some embodiments, the inorganic fiber layer has a basis weight in a range from 800 g/m$^2$ to 8500 g/m$^2$.

Mats and articles comprising mats described herein are useful, for example, in pollution control devices and thermal insulation applications (e.g., to insulate various components of an exhaust system (e.g., an exhaust pipe, the inlet or outlet end cone of a pollution control device or exhaust manifold of an internal combustion engine)). An exemplary pollution control device comprises a pollution control element (e.g., catalytic converter, a diesel particulate filter, or a selective catalytic reduction element) mounted in a casing with a non-woven mat described herein. An exemplary exhaust system comprises a double walled exhaust component and a mat or article comprising a mat described herein, wherein the article or mat is positioned in a gap between the walls of the double wall exhaust component.

In another embodiment, the present disclosure describes an exhaust system comprising a double walled exhaust component and a mat positioned in a gap between the walls of the double wall exhaust component, the mat comprising:
  a non-woven layer having first and second, generally opposed major surfaces, the non-woven layer comprising inorganic fibers; and
  a first three dimensional, polymeric layer attached to the first major surface.
Typically, the non-woven layer has organic content not greater than 7 (6, 5, 4, 3, 2, 1, or even zero) percent by weight, based on total weight of the non-woven layer. Typically the average thickness of the first polymeric layer is up to 35 micrometers (in some embodiments up to 30, 25, 20, 15, or even up to 10 micrometers; in some embodiments, in a range from 10 micrometers to 25 micrometers). In some embodiments, the inorganic fiber layer has a basis weight in a range from 800 g/m$^2$ to 8500 g/m$^2$.

In another embodiment, the present disclosure describes a pollution control device comprising a pollution control element mounted in a casing with a mat comprising:
  a non-woven layer having first and second, generally opposed major surfaces, the non-woven layer comprising inorganic fibers, having first and second, generally opposed major surfaces; and
  a first three dimensional, polymeric layer attached to the first major surface.
Typically, the non-woven layer has organic content not greater than 7 (6, 5, 4, 3, 2, 1, or even zero) percent by weight, based on total weight of the non-woven layer. Typically the average thickness of the first polymeric layer is up to 35 micrometers (in some embodiments up to 30, 25, 20, 15, or even up to 10 micrometers; in some embodiments, in a range from 10 micrometers to 25 micrometers). In some embodiments, the inorganic fiber layer has a basis weight in a range from 800 g/m$^2$ to 8500 g/m$^2$.

In another embodiment, the present disclosure describes an article comprising:
  an object (e.g., a pollution control element) having a radius, r;
  a mat (e.g., mats described herein) wrapped substantially around the radius of the object without a physical overlap (typically within 95 percent of $2\pi r$; in some embodiments, within 96, 97, 98, or even within 99 percent of $2\pi r$);
  a non-woven layer having first and second, generally opposed major surfaces, the non-woven layer comprising inorganic fibers; and
  a first three dimensional, polymeric layer attached to the first major surface.

Advantages of typical embodiments of non-woven mats and articles described herein include reduced fiber shedding due to the presence of the polymeric layer(s). The polymeric layer(s) associated with non-woven mats and articles described herein optionally can provide a better attachment surface for the non-woven mats and articles compared to a layer of the fibers therein, and may additionally may prevent cracking or breaking in the non-woven layer, for example, when wrapped around a 7.5 cm diameter rod.

DETAILED DESCRIPTION

Figure 1:
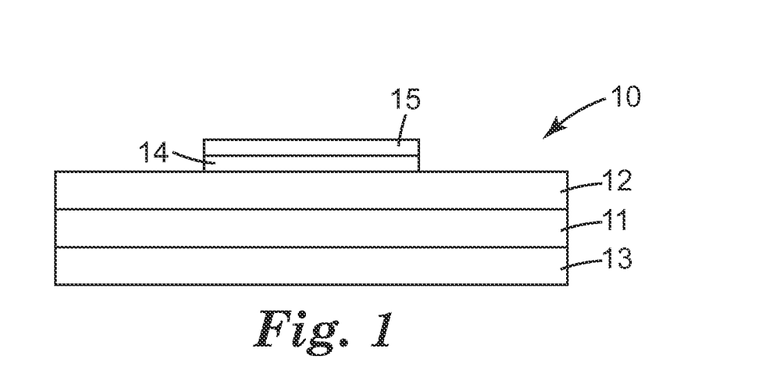
FIGS. 1-3 are cross-sectional views of exemplary mats described herein.

Referring to FIG. 1, exemplary mat described herein 10 has non-woven inorganic layer 11, first polymeric layer 12, optional second polymeric layer 13, optional adhesive 14, and optional release liner 15.

Figure 2:
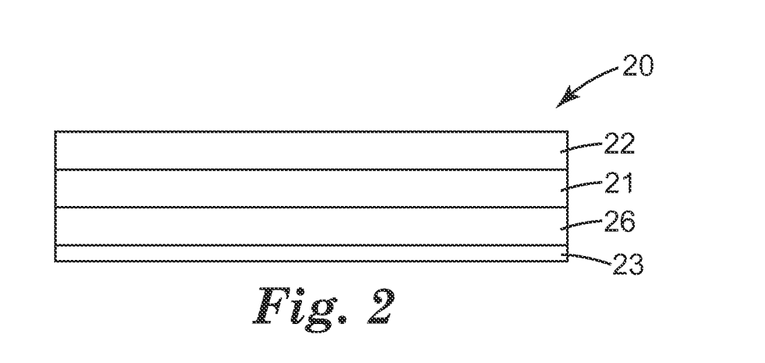

Referring to FIG. 2, exemplary mat described herein 20 has non-woven inorganic layer 21, first polymeric layer 22, optional intumescent layer 26, and optional second polymeric layer 23.

Figure 3:
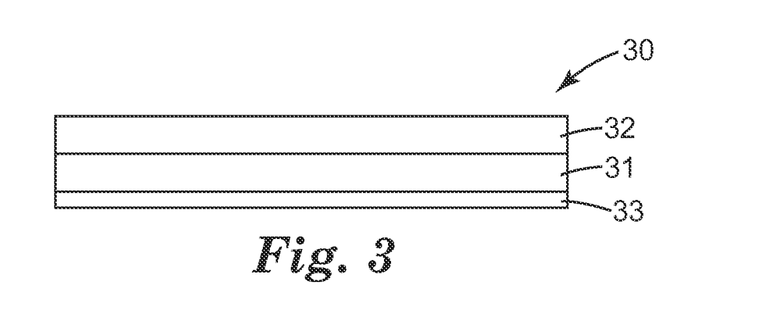

Referring to FIG. 3, exemplary mat described herein 30 has non-woven inorganic, intumescent layer 31, first polymeric layer 32, and optional second polymeric layer 33.

Figures 4, 5:
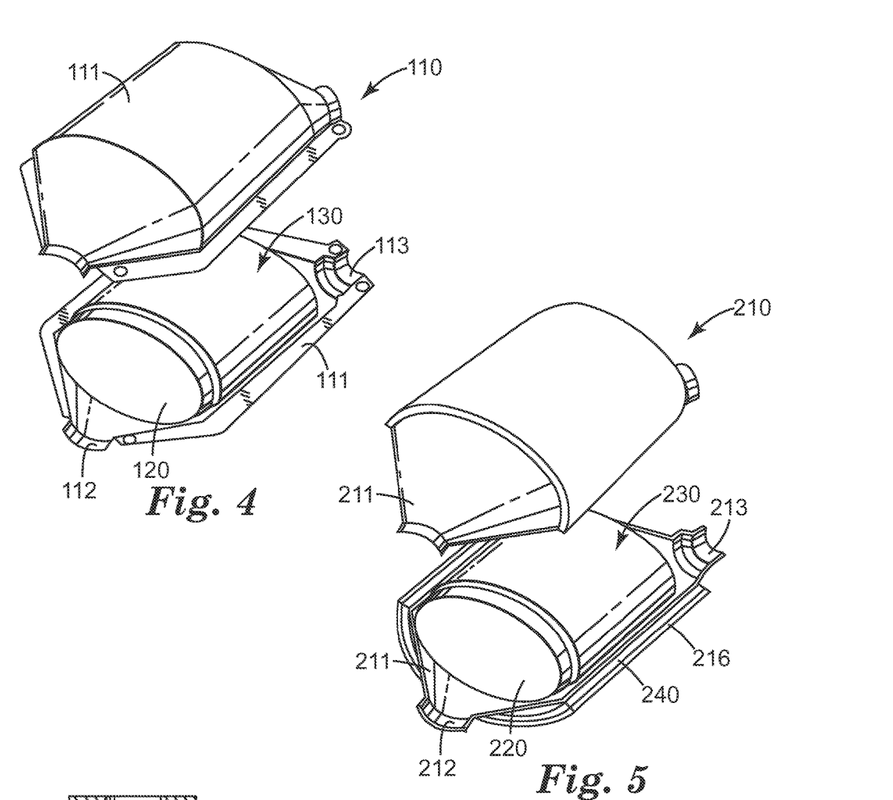
FIGS. 4 and 5 are perspective views of an exemplary pollution control device described herein.

Referring to FIG. 4, pollution control device 110 comprises metallic casing 111 with generally frusto-conical inlet and outlet ends 112 and 113, respectively. Disposed within casing 111 is pollution control element 120 surrounded by a mat according to the present disclosure 130. The mounting mat serves to tightly but resiliently support and hold monolithic element 120 within casing 111 and seals the gap between the pollution control element casing 111, preventing or reducing (preferably minimizing) exhaust gases from by-passing pollution control element 120.

Referring to FIG. 5, pollution control device 210 comprises metallic casing 211 with generally frusto-conical inlet and outlet ends 212 and 213, respectively, and heat shield 216. Disposed within casing 211 is pollution control element 220 surrounded by a first mat according to the present disclosure 230. The mounting mat serves to tightly but resiliently support and hold monolithic element 220 within casing 211 and seals the gap between the pollution control element casing 211, preventing or reducing (preferably minimizing) exhaust gases from by-passing pollution control element 220. A second mat according to the present disclosure 240 is disposed between casing 211 and heat shield. Mat 240 serves to provide thermal insulation.

Figure 6:
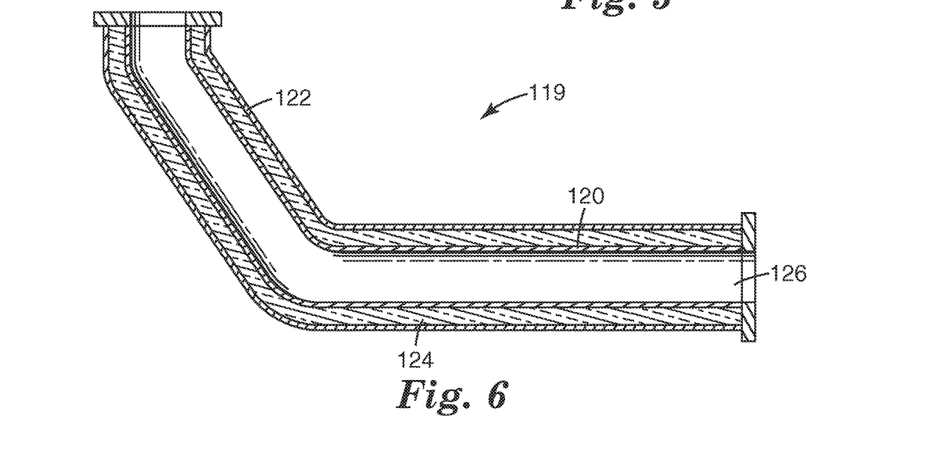
FIG. 6 is a longitudinal cross section of an exemplary exhaust pipe described herein.

Referring to FIG. 6, exhaust pipe 119 comprises a double wall having first outer metal wall 122, second and inner metal wall 120. Non-woven mat according to the present disclosure 124 is disposed in the gap between outer wall 122 and inner wall 120 and provides thermal insulation. The double wall of exhaust pipe 119 surrounds interior space 126 through which exhaust gas flows through when exhaust pipe 119 is in use in an exhaust system of a motor vehicle.

"Fibers," as used herein, have a length of at least 5 micrometers, and an aspect ratio of at least 3:1 (i.e., length to diameter).

Exemplary inorganic fibers include a variety of oxides such as silicates, aluminates, alumino-silica compounds, zircon, biosoluble compositions (e.g., calcium magnesium silicate and magnesium silicate), glass compositions (e.g., S-glass and E-glass), amorphous, crystalline, and partially crystalline compositions, and mineral fibers (basalts), mineral wools, and combinations, as well as carbides (e.g., silicon carbide and silicon carbide), nitrides (e.g., silicon nitride and boron nitride), and combinations thereof.

In some embodiments, the inorganic fiber layer comprises glass (i.e., amorphous material (i.e., material derived from a melt and/or a vapor phase that lacks any long range crystal structure) having a softening point, and comprising collectively not more than 95% percent by weight $SiO_2$ (if present) and $Al_2O_3$ (if present), based on the total weight of the inorganic fibers, where in the glass has a softening point as determined by ASTM C338-93 (2008), the disclosure of which is incorporated herein by reference), of at least than 400° C. Exemplary glass fibers include (e.g., magnesium aluminum silicate glass fibers).

Exemplary magnesium aluminum silicate glass fibers include E-glass fibers, S-glass fibers, S-2 glass fibers, R-glass fibers, and mixture thereof. E-glass, S-glass and S-2 glass are commercially available, for example, from Advanced Glassfiber Yarns, LLC, Aiken, S.C. R-glass is commercially available, for example, from Saint Gobain Vetrotex, Chambery, France.

In some embodiments, the inorganic fiber layer comprises refractory ceramic fibers (e.g., aluminosilicate fibers (including annealed and amorphous aluminosilicate fibers), alumina fibers, silica fibers, and basalt fibers). "Refractory," in the context of refractory ceramic fibers, refers to amorphous man-made inorganic materials produced from a melting, blowing or spinning of calcined kaolin clay or a combination of alumina and silica. Other oxides such as ziconia, titania, magnesia, iron oxide, calcium oxide, and alkalies may also be present. $SiO_2$ content of the refractory material is greater than 20% by percent by weight, and $Al_2O_3$ is greater than 20%, by weight, wherein $SiO_2$ and $Al_2O_3$ collectively comprise at least 95% of the inorganic material. Optionally, refractory ceramic fibers can be partially or completely crystallized by heat treatment. Exemplary amorphous, refractory aluminosilicate ceramic fibers include blown or spun amorphous refractory ceramic fibers (commercially available, for example, from Thermal Ceramics, Augusta, Ga., under the trade designation "KAOWOOL" and "CERAFIBER," and from Unifrax Corporation, Niagara Falls, N.Y., under the trade designation "FIBERFRAX").

In some embodiments, the inorganic fiber layer comprises polycrystalline ceramic fibers (e.g., such as those available under the trade designations "SAFFIL" from Saffil Automotive, Chelsea, Mich., and "MAFTEC" from Mitsubishi Chemicals USA, Inc., Chesapeake, Va.).

In some embodiments, the inorganic fiber layer comprises biosoluble fibers (e.g., at least one of magnesium silicate fibers or calcium magnesium silicate fibers).

As used herein, "biosoluble inorganic fibers" refer to inorganic fibers that are decomposable in a physiological medium or a simulated physiological medium. Physiological medium refers to, but is not limited to, those bodily fluids typically found in the respiratory tract such as the lungs of animals or humans. Exemplary biosoluble inorganic fibers include those comprised of oxides of silicon, magnesium, and calcium (including calcium magnesium silicate fibers). These types of fibers are typically referred to as calcium magnesium silicate fibers and magnesium silicate fibers.

Biosoluble fibers are commercially available, for example, from Unifrax Corporation, Niagara Falls, N.Y., under the trade designations "ISOFRAX" and "INSULFRAX," under the trade designations "SUPERMAG 1200" from Nutec Fiberatec, Monterrey, Mexico, and Thermal Ceramics, Augusta, Ga., under the trade designation "SUPERWOOL." "SUPERWOOL 607" biosoluble fibers, for example, contain 60 to 70 weight percent $SiO_2$, 25 to 35 weight percent CaO, 4 to 7 weight percent MgO, and a trace amount of $Al_2O_3$.

As used herein, the term "heat-treated silica fibers" refers to inorganic fibers comprising at least 95 percent by weight $SiO_2$, which have been exposed to a heat treatment temperature of at least 400° C. for a heat treatment period of at least 5 minutes.

Exemplary heat-treated high silica content fibers are commercially available, for example, from Hitco Carbon Composites, Inc., Gardena, Calif., under the trade designation "REFRASIL." For example, the "REFRASIL F100" fiber contains about 96 to about 99 percent by weight $SiO_2$.

Basalt fibers are made from the mineral basalt. Basalt is a hard, dense volcanic rock that can be found in most countries. The basalt is crushed, washed, melted, and fed into platinum-rhodium extrusion bushings to form continuous filaments. Because the fibers are derived from a mineral, the composition of the fibers can vary but generally has a composition, by weight, of about 45 to about 55 percent $SiO_2$, about 2 to about 6 percent alkalis, about 0.5 to about 2 percent $TiO_2$, about 5 to about 14 percent FeO, about 5 to about 12 percent MgO, at least about 14 percent by weight $Al_2O_3$, and often nearly about 10 percent CaO.

Optionally, non-woven layers, or another layer of a mat described herein, that are required to be intumescent, further comprise intumescent material (e.g., vermiculite). In some embodiments, it is preferable that the mat is non-intumescent (i.e., free of intumescent material (e.g., free of vermiculite)). The intumescent material can be present in a non-woven layer and/or as one or more separate layers. As used herein, "non-intumescent" refers to a material that exhibits less than 10 percent free expansion in thickness under the same conditions. Some non-intumescent materials expand less than 8 percent, less than 6 percent, less than 4 percent, less than 2 percent, or less than 1 percent when heated.

In some embodiments, non-woven layers described herein further contain an organic binder in amounts up to 7 (or more) weight percent based on the weight of the non-woven layer. The organic binder is typically burned off when the multilayer mat containing the non-woven layer is used at elevated temperatures such as those typically encountered in a pollution control device.

Non-woven layers described herein can be made, for example, using wet (typically wet-laid) or dry (typically dry-laid) processes known in the art. Optionally, non-woven layers described herein can be heat-treated.

In some embodiments, the inorganic fibers are shot free, or contain a very low amount of shot (e.g., less than 1% by weight, based on total weight of the fibers), while in other embodiments, the shot content can be even greater than 50% by weight, based on the total weight of the fibers.

Optionally, at least the non-woven layer(s) of some embodiments of mounting mats described herein are needle-punched (i.e., where there is physical entanglement of fibers provided by multiple full or partial (in some embodiments, full) penetration of the mat, for example, by barbed needles). The nonwoven mat can be needle punched using a conventional needle punching apparatus.

Optionally, some embodiments of mounting mat described herein are stitchbonded using conventional techniques (see, e.g., U.S. Pat. No. 4,181,514 (Lefkowitz et al.), the disclosure of which is incorporated herein by reference for its teaching of stitchbonding nonwoven mats).

Intumescent layers include at least one type of intumescent material. Intumescent layer can further include inorganic fibers, organic binders, plasticizers, wetting agents, dispersants, defoaming agents, latex coagulants, fungicides, filler materials, inorganic binders, and organic fibers.

Exemplary intumescent materials include unexpanded vermiculite, hydrobiotite, water swellable synthetic tetrasilicic fluorine type mica as described in U.S. Pat. No. 3,001,571 (Hatch), alkali metal silicate granules as described in U.S. Pat. No. 4,521,333 (Graham et al.), expandable graphite, or combinations thereof. Alkaline metal silicate granules are commercially available, for example, from 3M Company, St. Paul, Minn., under the trade designation "EXPANTROL 4BW." Expandable graphite is commercially available, for example, under the trade designation "GRAFOIL GRADE 338-50" from UCAR Carbon Co., Inc., Cleveland, Ohio. Unexpanded vermiculite is commercially available, for example, from Cometals Inc., New York, N.Y. In some applications, the intumescent materials are selected from unexpanded vermiculite, expandable graphite, or a combination thereof. The vermiculite can be treated, for example, with salts such as ammonium dihydrogen phosphate, ammonium nitrate, ammonium chloride, potassium chloride, or other soluble salts known in the art.

Intumescent layers often contain at least 5, at least 10, at least 20, at least 40, or at least 60 weight percent intumescent material, based on the weight of the intumescent layer. In some intumescent layers, the layer can be free of inorganic fibers. In other intumescent layers, the layer can be free of inorganic fibers and organic binders. In still other intumescent layers, the layer contains 5 to about 85 weight percent intumescent material, and less than 20 weight percent organic binder, based on the weight of the intumescent layer. Inorganic fibers are included in some intumescent layers.

Exemplary intumescent layers are commercially available, for example, from 3M Company, St. Paul, Minn., under the trade designations "INTERAM 100," "INTERAM 200," "INTERAM 550," and "INTERAM 2000 LT." These layers usually have a bulk density of about 0.4 to about 0.7 g/cm$^3$ and a weight per unit area of about 1050 g/m$^2$ to about 8140 g/m$^2$. Another exemplary intumescent layer is commercially available, for example, from 3M Company under the trade designation "INPE 570." This layer usually has a weight per unit area of about 1050 g/m$^2$ to about 4070 g/m$^2$ and contains inorganic fibers that that meet European non-classified fiber regulations.

In some embodiments of mats described herein including an intumescent layer(s), the non-woven layer(s) contains glass fibers and the intumescent layer(s) contains vermiculite.

Optionally, edge protection materials can be added to mats described herein. Edge protection materials can be stainless steel wire wrapped around the edges as described, for example, in U.S. Pat. No. 5,008,086 (Merry), incorporated herein by reference. Other suitable edge protection materials include braided or rope-like glass, ceramic, or metal fibers as described, for example, in U.S. Pat. No. 4,156,533 (Close et al.), incorporated herein by reference. Edge protection materials can also be formed from compositions having glass particles as described, for example, in EP 639 701 A2 (Howorth et al.), EP 639 702 A2 (Howorth et al.), and EP 639 700 A2 (Stroom et al.), all of which are incorporated by reference.

The thickness of a particular layer in the mat can vary depending on the particular application. In some embodiments, the thickness of the intumescent layer (if present) is no greater than the thickness of each of the non-woven layer(s). In some applications, the thickness of the intumescent layer (if present) is no greater than 50 percent, no greater than 45 percent, no greater than 40 percent, no greater than 35 percent, no greater than 30 percent, no greater than 25 percent, or no greater than 20 percent of the thickness of the non-woven layer(s).

In some embodiments, non-woven layers described herein have a thickness in the range from 1 mm to 35 mm (in some embodiments, in a range from 5 mm to 25 mm; 5 mm to 20 mm, or even 5 mm to 15 mm). In some embodiments, intumescent (including non-woven intumescent) layers described herein have a thickness in the range from 1 mm to 25 mm (in some embodiments, in a range from 1 mm to 20 mm; 1 mm to 15 mm, or even 1 mm to 10 mm). In some embodiments, mats described herein have a thickness in the range from 3 mm to 50 mm (in some embodiments, in a range from 5 mm to 35 mm; 5 mm to 20 mm, or even 5 mm to 10 mm).

In some embodiments. non-woven mats and non-woven layers described herein further comprise a second polymeric layer attached to the second major layer. Typically, the thickness of the second polymeric layer is up to 35 micrometers (in some embodiments up to 30, 25, 20, 15, or even up to 10 micrometers; in some embodiments, in a range from 10 micrometers to 25 micrometers).

A wide variety of thermoplastic and/or thermoformable polymers are useful for the polymeric layers. Exemplary polymeric layers comprise polypropylene and polyethylene (e.g., low density polyethylene and linear low density polyethylene), polyurethanes, polyamides, polybutadienes, polycarbonates, polystyrenes, polyesters, copolymers, and blends thereof. The polymeric layer is three-dimensional (i.e., the polymeric layer generally conforms to the outer surface of these fibers), wherein the polymeric material has an overall three dimensional structure in which the variation in the topography of polymeric surface in the "z" direction is greater than the average thickness of the polymeric film layer, and is typically at least partially into the major surface (i.e., at least partially penetrates into the layer of the major surface) to which it is applied (see, e.g., FIGS. 7 and 8 that shows a polymeric layer 71 and 81, respectively, on a major surface of a non-woven layer having fibers 81 and 82, respectively). The three-dimensional polymeric layer is typically in intimate contact with fibers exposed at the exposed major surface it is in contact with. Typically, the bond between the three dimensional polymeric film and the fiber layer is greater than the cohesive strength of the fiber layer.

Polymeric layers can be provided for making mats described herein, for example by a method comprising:
- providing a non-woven layer having first and second generally opposed major surfaces, the non-woven layer comprising inorganic fibers;
- applying a vacuum to the second major surface of the nonwoven layer;
- applying a first polymeric layer to the first major surface to provide the mat.

Optionally, the method further comprises applying a vacuum to the first polymeric layer attached to the first major surface and applying a second polymeric layer to the second major surface to provide the mat with a second polymeric layer. It is desirable to have perforations present in at least the first polymeric layer. Such perforations aid the process of attaching the second polymeric layer to the non-woven layer via a vacuum process. The perforations in the first polymeric layer allow air to be pulled out of the non-woven layer through the first polymeric layer, thereby forming a vacuum in the non-woven layer that can pull the second polymeric layer down onto the second major surface.

The polymeric layers used on mats described herein can be perforated, for example, so as to form at least one and preferably a plurality of vacuum-formed suction holes through the polymeric layer. The holes formed through the first polymeric layer allow a vacuum to be pulled through the first polymeric layer, when attaching a second polymeric layer. A "suction hole" can refer to a hole formed through a polymeric layer, when the polymeric layer is positioned on a major surface of a non-woven layer comprising inorganic fibers, and a vacuum is pulled on the opposite major surface of the non-woven layer, while the polymeric layer is heated to a softening point that allows the vacuum (a) to pull the polymeric layer into contact with inorganic fibers in the non-woven layer and (b) to form one or more suction holes through the polymeric film. The heating step can cause localized melting in the polymeric layer that helps the vacuum form such suction holes.

Pulling the polymeric layer into contact with the inorganic fibers can result in forming the polymeric layer into a three-dimensional polymeric layer. The suction holes typically form in areas of the polymeric layer that span across an open space between inorganic fibers at the major surface of the non-woven layer. See, for example, the suction holes (i.e., the black spots) shown in FIGS. 7 and 8). The polymeric layer can have an area and comprises a plurality of vacuum-formed suction holes. The suction holes are typically non-uniformly distributed over the area of the polymeric layer. Each of the suction holes typically have a different hole shape. Each of the suction holes is often a non-symmetrical shaped hole, like those shown in FIGS. 7 and 8.

Figure 11:
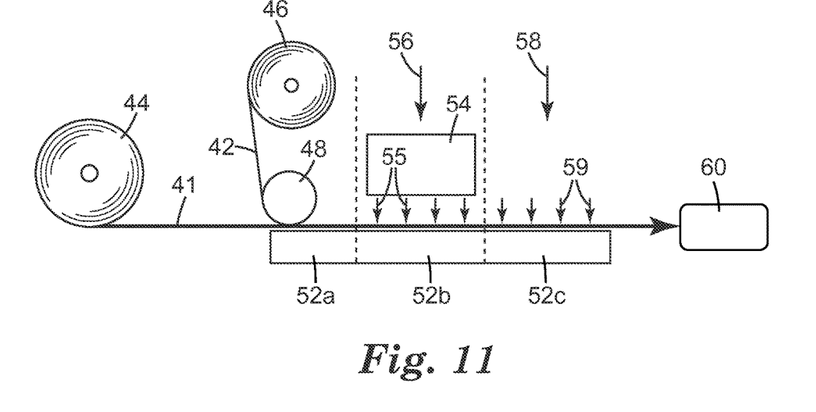
FIG. 11 is a flow diagram of one embodiment of a process for making a mat according to the present invention with vacuum-formed suction holes in the polymeric layer.

Referring to FIG. 11, one process for forming such vacuum-formed suction holes utilizes equipment that includes a station 44 for unwinding a rolled-up web 41 of a non-woven layer or mat material; a station 46 for unwinding a rolled-up web 42 of a polymeric layer or sheet material; a guide roller 48 for guiding and positioning the web of polymeric material over the top major surface of the web 41 of non-woven material; a vacuum box with up to three vacuum zones 52a, 52b and 52c positioned underneath the web 41 of non-woven material; a source of heat 54 (e.g., electrical heating elements) positioned above the web 42 of polymeric material; and a station 60 for winding the resulting web of mat material (i.e., the combination of at least the polymeric layer 42 and the non-woven layer 41) into a roll. The station 60 pulls this mat web, and thereby the individual webs 41 and 42, through a heating zone 56 followed by a freezing or cooling zone 58.

The non-woven web material 41 is sufficiently porous to allow enough of a vacuum to be formed through the non-woven material that the web of polymeric material is pulled (i.e., suctioned) down against the top major surface of the non-woven web 42. The webs 41 and 42 are kept together as they travel past the guide roller 48 by vacuum forces pulled by the first vacuum zone 52a. As the webs 41 and 42 travel through the heating zone 56, heat from source 54 radiates in the direction of arrows 55 so as to at least soften, or partially melt, the polymeric web 42. At the same time the polymeric web 42 is softening and/or melting in zone 56, the vacuum formed by vacuum zone 52b can be controlled so as to cause the polymeric web 42 to be pulled so as to deform into a three-dimensional shape against the fibers of the non-woven material. The vacuum of zone 52b can also cause suction holes to form through the polymeric web 42, especially where the web 42 is the softest or melted. Once suction holes open up, air heated by source 54 can be pulled into the non-woven web material 41 through the suction holes. The additional heat from this heated air (see arrows 55) can help to soften and/or melt the web 42 and, thereby, increase the number of suction holes formed in web 42, increase the size of existing suction holes, facilitate bonding between the polymeric web 42 and the non-woven web 41, or any combination thereof. The temperatures in the cooling zone 58 are sufficiently lower than those found in zone 56 to cause the softened and/or melted polymeric material of web 42 to harden and/or solidify. The vacuum applied in zone 52c pulls cooler air through the suction holes of web 42 in the direction of arrows 59, which cools the previously heated webs 41 and 42. In addition to the cooling effect caused by the vacuum in zone 52c, the cooling in zone 58 can also be optionally assisted by use of conventional refrigeration or air conditioning equipment.

The vacuum-formed suction holes in the first web 42 of polymeric material allow a second polymeric layer to be bonded to the other major surface of the non-woven web 41. To apply the second polymeric layer, the roll of wound mat web 50 at station 60 can be positioned at station 44 and the web 50 oriented so that the perforated polymeric web 42 is disposed underneath the non-woven web 41 and the other major surface of web 41 is exposed and facing up. Another web 42 of the same or different polymeric material can then be attached to the exposed major surface of web 41 using equipment 40 in the same manner as described above. The previously formed suction holes in the first web 42 allow the vacuum formed in zones 52a, 52b and 52c to pull a vacuum in the non-woven web 41.

Optionally, the mat also includes one or more intumescent layers, and optionally the methods described above are used to apply a polymeric layer to a major surface of an intumescent layer.

Optionally, a doubled-sided adhesive tape is attached to at least a portion of an exposed outer major surface of the first polymeric layer. Optionally, the doubled-sided adhesive tape includes a release liner.

Preferably, the inorganic fiber layer has a basis weight of at least 300 g/m$^2$, 400 g/m$^2$, 500 g/m$^2$, 600 g/m$^2$, 700 g/m$^2$, 800 g/m$^2$, 900 g/m$^2$, 1300 g/m$^2$, 2000 g/m$^2$, or even at least 3100 g/m$^2$ (in some embodiments, in a range from 300 g/m$^2$ to 8500 g/m$^2$).

Non-woven layers and mats described herein, as-made, prior to heating above 500° C., contain not greater than 7 (in some embodiments, not greater than 6, 5, 4, 3, 2, 1, or even zero percent by weight organic material, based on the total weight of the non-woven or mat, as applicable.

Non-woven layers and mats described herein typically are sufficiently flexible to be wrapped around a 7.5 cm diameter rod without breaking. The mats usually can be handled and wrapped around a pollution control element in a pollution control device without breaking or cracking. When wrapped around a pollution control element, the ends of the multilayer mat can meet in a variety of junctions.

Mats and nonwoven layers described herein can be cut for example, using a die or laser cutting techniques. Laser cut edges are preferred because Applicants observed that the use of die-cutting tools often deteriorates the bond quality between the polymeric film and the nonwoven along the edges. This partial de-lamination can affect and compromise the performance of the mat (increased fiber shedding on exposed edges, interference with mat installation process, etc.). It was found that the use of a laser beam to cut parts from the mat described herein can significantly limit polymeric layer de-lamination. After a part is cut using a laser beam, the intersection between the major surfaces of the mat (which include the polymeric film) and the minor surface or edge generated during the cut, is sealed, as the laser beam locally softens and/or melts the polymeric layer around the fibers comprised in the nonwoven. The laser beam can also seal the minor surface or edge generated during the cut, preventing further fiber shedding.

Figure 9:
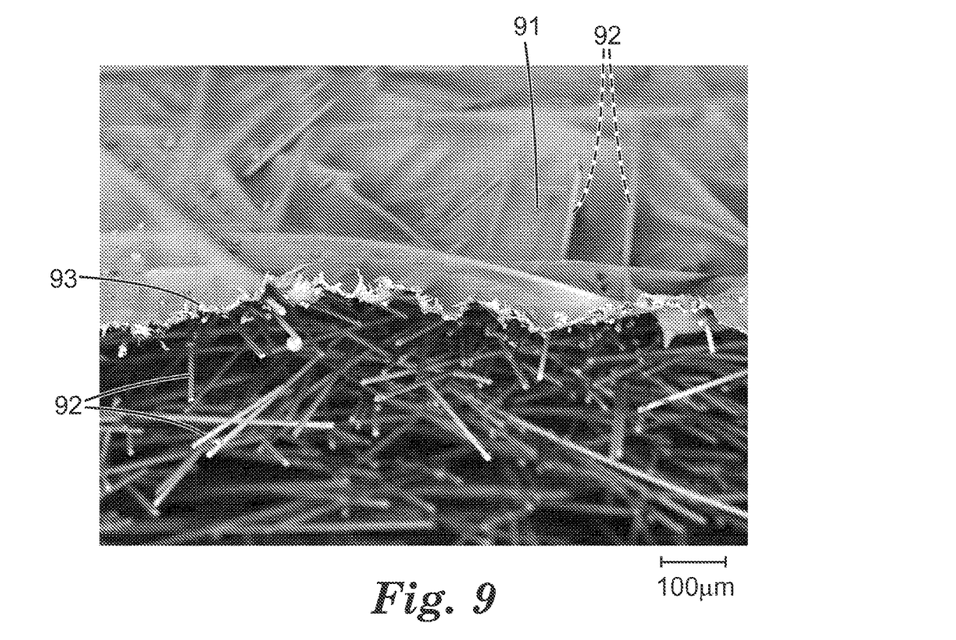
FIG. 9 is a scanning electron microscope digital image at 200× magnification of a die cut edge of the Example 1 mat.
Figure 10:
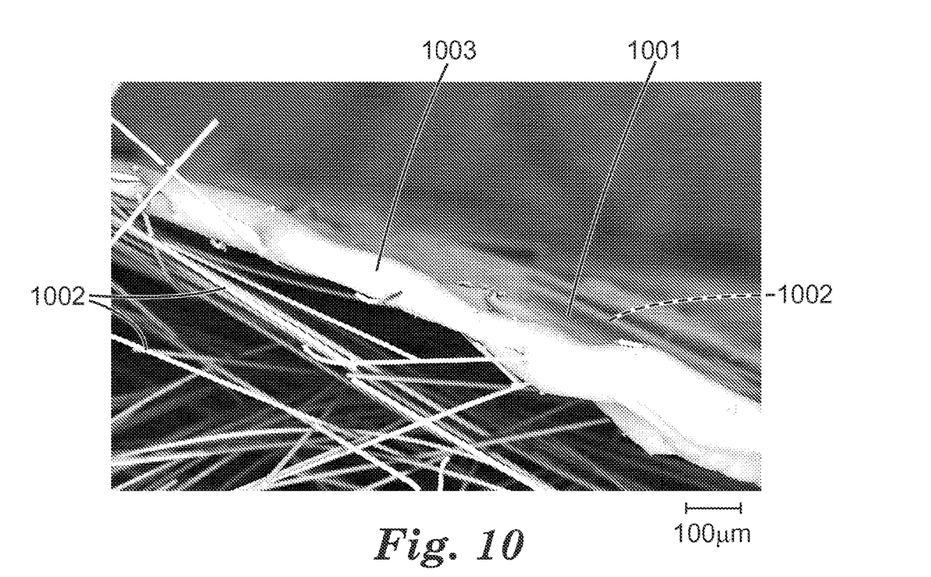
FIG. 10 is a scanning electron microscope digital image at 200× magnification of a laser cut edge of the Example 1 mat.

Referring to FIG. 9, a scanning electron microscope digital image at 200× magnification of a die cut edge of an exemplary mat described herein (Example 1) mat is shown having polymeric layer 91, fibers 92, and die cut edge 93 of polymeric layer 91. Referring to FIG. 10, a scanning electron microscope digital image at 200× magnification of a laser cut edge of an exemplary mat described herein (Example 1) mat is shown having polymeric layer 1001, fibers 1002, and laser cut edge 1003 of polymeric layer 1001 is shown.

"Refractory" as used herein with cloths for surrounding mats described herein means that the material has as least one of a softening point (as determined by ASTM 0338-93 (2008), the disclosure of which is incorporated herein by reference) or melting point above 450° C. Exemplary refractory clothes for surrounding mats described herein include glass fabrics and silica fabrics. Exemplary refractory clothes for surrounding mats described herein are commercially available under the trade designations "AVS FIBER GLASS FABRICS," "FLXGLAS HT TREATED FIBERGLASS FABRICS," AND "AVSIL PLAIN WEAVE SILICA FABRICS," from AVS Industries, LLC, New Castle, Del.

The metallic casing can be made from materials known in the art for such use, including stainless steel.

The nonwoven mat can be used as a thermal insulation material to insulate various components of an exhaust system including, for example, an exhaust pipe, the inlet or outlet end cone of a pollution control device or exhaust manifold of an internal combustion engine. Non-woven mats described herein are useful, for example, in pollution control devices. A pollution control device typically comprises a pollution control element (e.g., catalytic converter, a diesel particulate filter, or a selective catalytic reduction element) mounted in a casing with a non-woven mat described herein. In an exhaust system comprising a double walled exhaust component (e.g., an exhaust pipe, an end cone end cap, or other portion of a pollution control device, and/or an exhaust manifold) and the nonwoven mat described herein, the nonwoven mat can be mounted in the gap between the first outer wall and second inner wall of the double wall component. Exemplary mount densities are in a range from about 0.1 g/cm$^2$ to 0.6 g/cm$^2$.

Exemplary pollution control elements that can be mounted with mounting mat described herein include gasoline pollution control elements as well as diesel pollution control elements. The pollution control element may be a catalytic converter or a particulate filter, or trap. Catalytic converters contain a catalyst, which is typically coated on a monolithic structure mounted within a metallic housing. The catalyst is typically adapted to be operative and effective at the requisite temperature. For example, for use with a gasoline engine the catalytic converter should typically be effective at a temperature in a range from 400° C. to 950° C., whereas for a diesel engine lower temperatures (typically not more than 350° C.) are common. The monolithic structures are typically ceramic, although metal monoliths are also sometimes used. The catalyst oxidizes carbon monoxide and hydrocarbons and reduces the oxides of nitrogen in exhaust gases to control atmospheric pollution. While in a gasoline engine all three of these pollutants can be reacted simultaneously in a so-called "three way converter," most diesel engines are equipped with only a diesel oxidation catalytic converter. Catalytic converters for reducing the oxides of nitrogen, which are only in limited use today for diesel engines, generally consist of a separate catalytic converter. Examples of pollution control elements for use with a gasoline engine include those made of cordierite that are commercially available, for example, from Corning Inc., Corning, N.Y., or NGK Insulators, LTD., Nagoya, Japan, or metal monoliths commercially available, for example, from Emitec, Lohmar, Germany.

Suitable selective catalytic reduction elements are available, for example, from Corning, Inc., Corning, N.Y.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable diesel particulate filters made of cordierite are commercially available, for example, from Corning Inc. and NGK Insulators, Inc. Diesel particulate filters made of silicon carbide are commercially available, for example, from Ibiden Co. Ltd., Japan, and are described in, for example, JP 2002047070A, published Feb. 12, 2002.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A single roll of 76 cm (30 inches) wide, 15 micrometers (0.006 inch) thick clear low density polyethylene linear film (obtained under the trade designation "ALTEX" from Flex-Sol Packaging, Chicago Ill.) was unrolled and laminated onto a 66 cm. (26 inch) wide web of 2000 grams per square meter mounting mat material (the material marketed by 3M Company, St. Paul, Minn., under the trade designation "INTERAM™ MAT MOUNT 1220 NC) over a vacuum table having eight 1.3 cm (0.5 inch) wide slots placed 2.54 cm (1 inch) apart. A stainless steel carrier web was used to transport the film and mat over the vacuum box. Two 2000 watt infrared lamps (Model Number SRU 1615HT; Infratech, Gardenia, Calif.) were used to heat the film and laminate the film and mat together. The lamps were centered over the vacuum slots with the first lamp being suspended 3.2 cm (1.25 inch) from the web, and the second lamp being positioned adjacent to the first lamp and suspended (3 inches) from the film surface. The line speed was 2.1 meters per minute (7 ft. per minute), with a vacuum draw sufficient to pull the film in intimate contact with the woven layer surface and yield a bond between the mat surface and film greater than the cohesive strength of the mat after exposure to the lamps and cooling to room temperature (typically about 7.6-15.2 cm (3-6 inches) of Hg).

Figure 7:
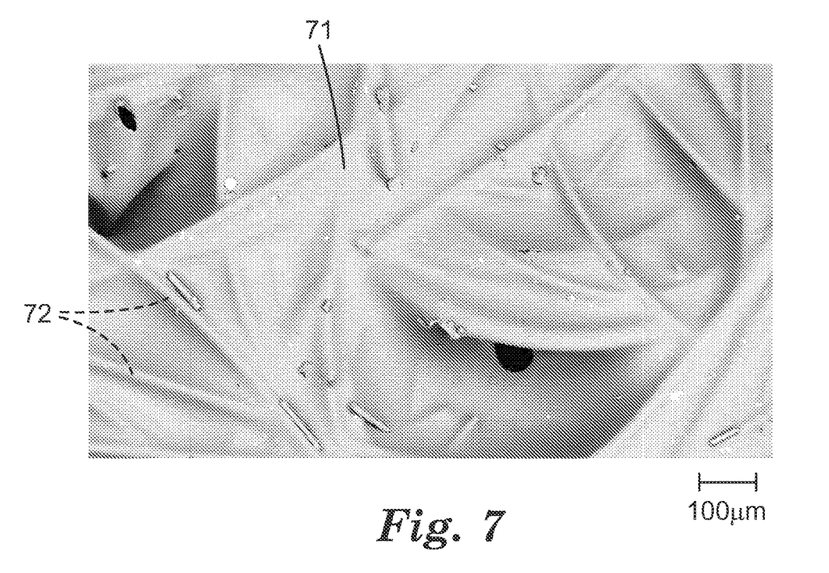
FIGS. 7 and 8 are scanning electron microscope digital images of the polymeric layer of the Example 1 mat at 50× and 200× magnification, respectively.
Figure 8:
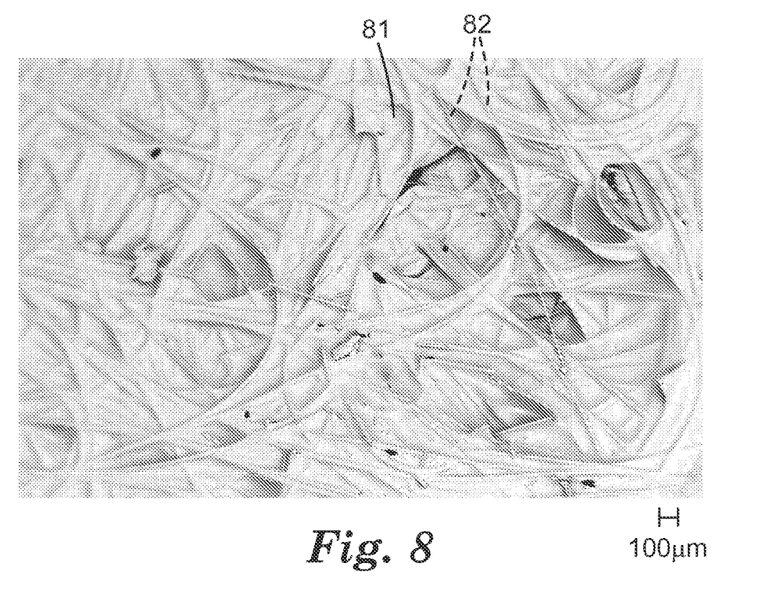

FIGS. 7 and 8 that shows the Example 1 mat having polymeric layer 71 and 81, respectively, on a major surface of the non-woven layer having fibers 72 and 82, respectively) at 50λ and 200× magnification, respectively. Example 1 mat was cut both with a conventional metallic ruled die and with a laser (a 2 kilowatt at 381 cm/per minute (150 inch per minute)) to provide a die cut edge and a laser cut edge. FIG. 9 is a scanning electron microscope digital image at 200× magnification of the die cut edge of the Example 1 mat showing polymeric layer 91, fibers 92, and die cut edge 93 of polymeric layer 91. FIG. 10 is a scanning electron microscope digital image at 200× magnification of a laser cut edge of the Example 1 mat showing polymeric layer 1001, fibers 1002, and laser cut edge 1003 of polymeric layer 1001.

The Example 1 mat was wrapped around a 7.6 cm (3 inch) diameter rod without breaking.

Example 2

Example 2 was prepared as described for Example 1, except a second layer of the low density polyethylene linear film ("ALTEX") was also laminated onto the bottom surface (i.e., both major surfaces of the mounting mat were laminated with the low density polyethylene linear film. Further, the line speed was reduced to 1.8 meters per minute (6 ft. per minute), and the vacuum draw was sufficient to pull the film in intimate contact with the woven layer surface and yield a bond between the mat surface and film greater than the cohesive strength of the mat after exposure to the lamps and cooling to room temperature (typically about 12.7-28 cm (5-11 inches) of Hg).

The Example 2 mat was wrapped around a 7.6 cm (3 inch) diameter rod without breaking.

Example 3

Example 3 was prepared as described for Example 1, except the mounting mat material was 5100 grams per square meter (the material marketed by 3M Company under the trade designation "INTERAM™ MAT MOUNT 700", the line speed was 1.8 meters per minute (6 ft. per minute), and the vacuum draw was sufficient to pull the film in intimate contact with the woven layer surface and yield a bond between the mat surface and film greater than the cohesive strength of the mat after exposure to the lamps and cooling to room temperature (typically about 12.7-28 cm (5-11 inches) of Hg).

The Example 3 mat was wrapped around a 7.6 cm (3 inch) diameter rod without breaking.

Example 4

Example 4 was prepared as described for Example 1, except the mounting mat material was 5800 grams per square meter (the material marketed by 3M Company under the trade designation "INTERAM™ MAT MOUNT 7220X" the line speed was 1.8 meters per minute (6 ft. per minute), and the vacuum draw was sufficient to pull the film in intimate contact with the woven layer surface and yield a bond between the mat surface and film greater than the cohesive strength of the mat after exposure to the lamps and cooling to room temperature (typically about 12.7-28 cm (5-11 inches) of Hg).

The Example 4 mat was wrapped around a 3 inch (7.6 cm) diameter rod without breaking.

Example 5

A web of INTERAM™ Mounting Mat Material 1220NC (3M Company St. Paul, Minn.), exhibiting 2000 gram per square meter, is carried on a metal mesh belt over six 1.27 cm. (0.5 inch) wide vacuum slots on 3.81 cm. (1.5 inch) centers at 3.66 meters per minute (12 feet per minute). A pressure differential of about 40 cm. of water (1.16 inches of Hg.) is maintained across the mat via the vacuum slots. A 0.0015 mm. (0.0006 inch) thick Linear Low Density Polyethylene film (FlexSol Packaging Corp. Bunsville, Minn.) is unrolled over the mat surface and heat bonded to the mat using a 31.8 cm. (15 inch) wide heat lamp (Raymax P1560AX019 0852 460 Volt 1800 Watt WatLow St. Louis, Mo.) suspended 2.54 cm. (1.0 inch) above the surface of the mat. Sufficient power is supplied to the heat lamp to maintain a lamp surface temperature of about 427 degrees C. (800 degrees F.) and a mat surface temperature upon exiting the heating area immediately beneath the lamp at about 149 degrees C. (300 degrees F.) as measured by a Scotchtrak Heat Tracer non-contact measuring device (Model IR-18EXL3 #M Company Austin, Tex.).

Exemplary Mat Embodiments

1. A mat comprising:
a non-woven layer having first and second major surfaces that are generally opposed to each other, the non-woven layer comprising inorganic fibers; and
a first polymeric layer attached so as to contact at least some of the inorganic fibers forming the first major surface, with the first polymeric layer comprising at least one vacuum-formed suction hole formed therethrough. The first polymeric layer is preferably a three-dimensional polymeric layer.

2. The mat of embodiment 1, wherein the first polymeric layer has an area and comprises a plurality of vacuum-formed suction holes, and the suction holes are non-uniformly distributed over the area of the first polymeric layer.

3. The mat of embodiment 2, wherein each of the suction holes has a different hole shape.

4. The mat of embodiment 2 or 3, wherein each of the suction holes is a non-symmetrical shaped hole.

5. The mat of any one of embodiments 1 to 4, further comprising:
an intumescent layer having first and second major surfaces that are generally opposed to each other, wherein the first major surface of the intumescent layer is attached to the second major surface of the non-woven layer.

6. The mat of any one of embodiments 1 to 4, wherein the non-woven layer is a non-woven intumescent layer further comprising intumescent material.

7. The mat of any one of embodiments 1 to 6, wherein the non-woven layer has organic content not greater than 7 percent by weight, based on total weight of the non-woven layer.

8. The mat of any one of embodiments 1 to 6, wherein the non-woven layer has organic content not greater than 1 percent by weight, based on total weight of the non-woven layer.

9. The mat of any one of embodiments 1 to 6, wherein the non-woven layer has a zero percent by weight organic content, based on total weight of the non-woven layer.

10. The mat of any one of embodiments 1 to 9, wherein the first polymeric layer has an average thickness of up to 35 micrometers.

11. The mat of any one of embodiments 1 to 9, wherein the first polymeric layer has an average thickness in a range from 5 micrometers to 25 micrometers.

12. The mat of any one of embodiments 1 to 9, wherein the first polymeric layer has an average thickness in a range from 10 micrometers to 25 micrometers.

13. The mat of any one of embodiments 1 to 12, wherein the first polymeric layer comprises a polymer that is thermoplastic (e.g., at least one of polypropylene or polyethylene).

14. The mat of any one of embodiments 1 to 13, further comprising a second polymeric layer attached so that the non-woven layer is between the first polymeric layer and the second polymeric layer, with the second polymeric layer comprising at least one vacuum-formed suction hole formed therethrough. The second polymeric layer is preferably a three-dimensional polymeric layer.

15. The mat of embodiment 14, wherein the second polymeric layer has an area and comprises a plurality of vacuum-formed suction holes, and the suction holes are non-uniformly distributed over the area of the second polymeric layer.

16. The mat of embodiment 14 or 15, wherein each of suction hole has a different hole shape.

17. The mat of any one of embodiments 14 to 16, wherein each suction hole is a non-symmetrical shaped hole.

18. The mat of any one of embodiments 14 to 17, wherein the second polymeric layer comprises a polymer that is thermoplastic.

19. The mat of any one of embodiments 14 to 18, wherein second polymeric layer has an average thickness up to 25 micrometers.

20. The mat of any one of embodiments 14 to 18, wherein second polymeric layer has an average thickness in a range from 5 micrometers to 25 micrometers.

21. The mat of any one of embodiments 14 to 18, wherein second polymeric layer has an average thickness in a range from 10 micrometers to 25 micrometers.

22. The mat of any one of embodiments 1 to 21, wherein the inorganic fibers include glass fibers comprising collectively not more than 95% percent by weight $SiO_2$ and $Al_2O_3$, based on the total weight of the glass fibers.

23. The mat of any one of embodiments 1 to 22, wherein the inorganic fibers include refractory ceramic fibers.

24. The mat of any one of embodiments 1 to 23, wherein the inorganic fibers include polycrystalline ceramic fibers.

25. The mat of any one of embodiments 1 to 24, wherein the inorganic fibers include biosoluble fibers.

26. The mat of any one of embodiments 1 to 25, wherein the non-woven layer has a basis weight of at least 900 $g/m^2$.

27. The mat of any one of embodiments 1 to 25, wherein the non-woven layer has a basis weight in a range from 800 $g/m^2$ to 8500 $g/m^2$.

28. The mat of any one of embodiments 1 to 27, wherein the fibers have diameters of at least 5 micrometers.

29. The mat of any one of embodiments 1 to 28, wherein the non-woven layer is at least one or any combination of being needled-punched, made via a wet-laid process, and made via a dry-laid process.

30. The mat of any one of embodiments 1 to 29, wherein the non-woven layer, as-made, prior to heating above 500° C., contains not greater than 7 percent by weight organic material, based on the total weight of the mat.

31. The mat of any one of embodiments 1 to 30, wherein the non-woven layer has an as-made bulk density in a range from 0.05 $g/cm^3$ to 0.3 $g/cm^3$.

32. The mat of any one of embodiments 1 to 31, wherein the non-woven layer has an average thickness in the range from 3 mm to 50 mm.

33. The mat of any one of embodiments 1 to 4 and 7 to 32, wherein the mat is non-intumescent.

34. The mat of any one of embodiments 1 to 4 and 7 to 32, wherein the mat is free of vermiculite.

35. The mat of any one of embodiments 1 to 34, wherein the non-woven mat is sufficiently flexible to be wrapped around a 7.5 cm diameter rod without breaking.

36. The mat of any one of embodiments 1 to 35 having at least one laser cut edge.

37. The mat of any one of embodiments 1 to 4 and 7 to 36, further comprising a first intumescent layer attached to the second major surface of the non-woven layer.

38. The mat of any one of embodiments 1 to 37, wherein the first polymeric layer has an exposed outer major surface having a doubled-sided adhesive tape attached thereto to at least a portion thereof.

39. The mat of embodiment 38, wherein the doubled-sided adhesive tape includes a release liner.

40. The mat of any one of embodiments 1 to 39, wherein the non-woven layer has a basis weight in a range from 800 $g/m^2$ to 3000 $g/m^2$.

41. The mat of any one of embodiments 1 to 40, in combination with a refractory cloth surrounding the mat.

Exemplary Pollution Control Device Embodiments

1. A pollution control device comprising a pollution control element mounted in a casing with the mat of any one of mat embodiments 1 to 41.

2. The pollution control device of embodiment 1, wherein the pollution element is one of a catalytic converter, a diesel particulate filter, or a selective catalytic reduction element.

Exemplary Exhaust System Embodiments

1. An exhaust system comprising a double walled exhaust component and the mat of any one of embodiments 1 to 41, wherein the mat is positioned in a gap between the walls of the double wall exhaust component.

2. The exhaust system of embodiment 1, wherein the double walled exhaust component is an exhaust pipe.

3. The exhaust system of embodiment 1, wherein the double walled exhaust component is an end cone of a pollution control device.

4. The exhaust system of embodiment 1, wherein the double walled exhaust component is an exhaust manifold.

Exemplary Article Embodiments

1. An article comprising:
an object having a radius r; and
the mat of any one of mat embodiments 1 to 41 wrapped substantially around the radius of the object without a physical overlap.

2. The article of embodiment 1, wherein the mat has a wrapped length within 99 percent of $2\pi r$.

3. The article of embodiment 1, wherein the mat has a wrapped length within 98 percent of $2\pi r$.

4. The article of embodiment 1, wherein the mat has a wrapped length within 95 percent of $2\pi r$.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A mat comprising:
a non-woven layer having first and second major surfaces that are generally opposed to each other, the non-woven layer comprising inorganic fibers;
a first polymeric layer attached so as to contact at least some of the inorganic fibers forming the first major surface, with the first polymeric layer comprising at least one vacuum-formed suction hole formed therethrough; and
a second polymeric layer attached so that the non-woven layer is between the first polymeric layer and the second polymeric layer.

2. The mat of claim 1, wherein the first polymeric layer has an area and comprises a plurality of vacuum-formed suction holes, and the suction holes are non-uniformly distributed over the area of the first polymeric layer.

3. The mat of claim 2, wherein each of the suction holes has a different hole shape, is a non-symmetrical shaped hole, or both.

4. The mat of claim 1, wherein the second polymeric layer comprises at least one vacuum-formed suction hole formed therethrough.

5. The mat of claim 1, wherein at least one of the first polymeric layer and the second polymeric layer is a three-dimensional polymeric layer.

6. The mat of claim 1, wherein the non-woven layer has organic content not greater than 7 percent by weight, based on total weight of the non-woven layer.

7. The mat of claim 1, wherein the non-woven layer has organic content not greater than 3 percent by weight, based on total weight of the non-woven layer.

8. The mat of claim 1, wherein the mat is non-intumescent.

9. The mat of claim 1, further comprising:
an intumescent layer having first and second major surfaces that are generally opposed to each other, wherein the first major surface of the intumescent layer is attached to the second major surface of the non-woven layer, and the second polymeric layer is attached so that the intumescent layer and the non-woven layer are between the first polymeric layer and the second polymeric layer.

10. The mat of claim 1, wherein the non-woven layer is a non-woven intumescent layer further comprising intumescent material.

11. The mat of claim 1, wherein the non-woven mat is sufficiently flexible to be wrapped around a 7.5 cm diameter rod without breaking.

12. A pollution control device comprising a pollution control element mounted in a casing with the mat of claim 1.

13. The pollution control device of claim 12, wherein the mat is non-intumescent.

14. The pollution control device of claim 12, where the mat further comprises:
an intumescent layer having first and second major surfaces that are generally opposed to each other, wherein the first major surface of the intumescent layer is attached to the second major surface of the non-woven layer, and the second polymeric layer is attached so that the intumescent layer and the non-woven layer are between the first polymeric layer and the second polymeric layer.

15. The pollution control device of claim 12, wherein the non-woven layer is a non-woven intumescent layer further comprising intumescent material.

16. An exhaust system comprising a double walled exhaust component and the mat of claim 1, wherein the mat is positioned in a gap between the walls of the double wall exhaust component.

17. The exhaust system of claim 16, wherein the mat is sufficiently flexible to be wrapped around a 7.5 cm diameter rod without breaking.

18. An article comprising:
an object having a radius defining a circumference; and
the mat of claim 1 wrapped substantially around the circumference of the object without a physical overlap.

19. The article of claim 18, wherein the non-woven mat is sufficiently flexible to be wrapped around a 7.5 cm diameter rod without breaking.

20. A method of making a mat, said method comprising:
providing a non-woven layer having first and second generally opposed major surfaces, the non-woven layer comprising inorganic fibers;
applying a first polymeric layer to the first major surface;
applying a vacuum to the second major surface of the nonwoven layer so as to form at least one vacuum-formed suction hole through the first polymeric layer;
applying a second polymeric layer to the mat so that the non-woven layer is between the first polymeric layer and the second polymeric layer; and
applying a vacuum to the first polymeric layer,
wherein the at least one vacuum-formed suction hole through the first polymeric layer allow a vacuum to be pulled through the first polymeric layer, when applying the second polymeric layer.

* * * * *

UNITED STATES PATENT AND TRADEMARK OFFICE
CERTIFICATE OF CORRECTION

PATENT NO. : 10,060,324 B2
APPLICATION NO. : 13/255000
DATED : August 28, 2018
INVENTOR(S) : Javier Gonzalez et al.

Page 1 of 1

It is certified that error appears in the above-identified patent and that said Letters Patent is hereby corrected as shown below:

In the Specification

Column 6, Line 36, delete "ziconia," and insert -- zirconia, --, therefor.

Column 7, Line 5, delete "Fiberatec," and insert -- Fibratec, --, therefor.

Signed and Sealed this
Ninth Day of October, 2018

Andrei Iancu
*Director of the United States Patent and Trademark Office*